United States Patent
Suganuma

(10) Patent No.: US 7,046,442 B2
(45) Date of Patent: May 16, 2006

(54) WIRE GRID POLARIZER

(75) Inventor: Takayoshi Suganuma, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 11/002,808

(22) Filed: Dec. 2, 2004

(65) Prior Publication Data

US 2005/0128587 A1    Jun. 16, 2005

(30) Foreign Application Priority Data

Dec. 5, 2003   (JP)  ............................. 2003-408035

(51) Int. Cl.
  *G02B 5/30*       (2006.01)
(52) U.S. Cl. ...................... 359/486; 359/495
(58) Field of Classification Search ................ 359/352, 359/486, 495

See application file for complete search history.

(56) References Cited

U.S. PATENT DOCUMENTS

| | | | | |
|---|---|---|---|---|
| 3,046,839 A | * | 7/1962 | Bird et al. ............... | 427/163.1 |
| 3,291,871 A | * | 12/1966 | Francis ...................... | 264/1.31 |
| 3,969,545 A | * | 7/1976 | Slocum .................... | 427/163.1 |
| 4,289,381 A | * | 9/1981 | Garvin et al. ............. | 427/163.1 |
| 4,514,479 A | * | 4/1985 | Ferrante ........................ | 430/2 |
| 5,177,635 A | * | 1/1993 | Keilmann ................... | 359/352 |
| 5,748,368 A | * | 5/1998 | Tamada et al. ............. | 359/486 |
| 6,122,103 A | * | 9/2000 | Perkins et al. ............. | 359/486 |
| 6,243,199 B1 | * | 6/2001 | Hansen et al. ............. | 359/486 |
| 6,532,111 B1 | * | 3/2003 | Kurtz et al. ................ | 359/486 |
| 6,714,350 B1 | * | 3/2004 | Silverstein et al. ......... | 359/486 |
| 2001/0053023 A1 | * | 12/2001 | Kameno et al. ............ | 359/486 |

\* cited by examiner

Primary Examiner—Ricky D. Shafer
(74) Attorney, Agent, or Firm—Koda & Androlia

(57) ABSTRACT

An object is to provide a wire grid polarizer with an excellent optical property, which enables to maintain the polarization extinction ratio high and level in the broadband wavelength region with a simple structure. A wire grid polarizer of the present invention comprises, a wire grid structural body in which a plurality of metal wires are formed and arranged at a certain period in a direction orthogonal to a longitudinal direction of the metal wires on a light-transmitting substrate, for transmitting only a specific linearly polarized light out of linearly polarized lights being orthogonal to each other, which make incident to the wire grid structural body, wherein a cross-sectional shape of the metal wire, which is orthogonal to the longitudinal direction, has a taper shape.

5 Claims, 7 Drawing Sheets

WIRE GRID POLARIZER

BACKGROUND OF THE INVENTION

1. Field of the Invention

The present invention relates to a wire grid polarizer and, more specifically, to a wire grid polarizer which is preferably used as a polarizing beam splitter for separating linearly polarized lights being orthogonal to each other by transmitting or reflecting the light, in a light pickup optical system, an optical fiber communication optical system, a projection-type liquid crystal projector, a light-receiving sensor optical system and the like.

2. Description of the Related Art

Conventionally, there have been various types of structures known as polarizer which transmits only linearly polarized light with a specific polarization component out of two linearly polarized lights being orthogonal to each other and absorbs or reflects the other polarization component.

Above all, recently, a type of polarizer shown in FIG. 1 as a wire grid polarizer 4 has drawn an attention as the one which exhibits such an excellent property that it can be used not only as a transmission type but also as a reflection type. The wire grid polarizer 4 in FIG. 1 comprises a wire grid structural body 3 in which a plurality of metal wires 2 are arranged at a certain period Λ provided on a light-transmitting substrate 1.

In other words, a conventional polarizer such as a polarizer, which is formed by doping fine metal particles on a substrate and drawing it, transmits only the linearly polarized light of a specific polarization component and absorbs a linearly polarized light of the other polarization component, while the wire grid polarizer 4 has the property of reflecting the linearly polarized light of the polarization component other than the linearly polarized light to be transmitted.

Therefore, not only the linearly polarized light of the polarization component transmitted through the wire grid polarizer 4 but also the linearly polarized light of the reflected polarization component can be picked up to be utilized. Thus, it has been expected to be utilized as a polarizer with a fewer loss in a wide range of optical field such as a pickup optical system, an optical fiber communication optical system, a liquid crystal projector and the like.

In the polarizer, there are two parameters such as a polarization extinction ratio and an insertion loss for indicating the performance.

The polarization extinction ratio is a parameter showing how little a leak of the polarization component is, which is present in the transmitted light and the reflected light, respectively.

When the metal wire 2 is formed and arranged at a certain period in a prescribed direction (in the lateral direction in FIG. 1) as shown in FIG. 1, most of TM polarized light with an electric field oscillation plane being orthogonal to the longitudinal direction of the metal wire 2 transmits through the wire grid polarizer 1 while the majority of TE polarized light with the electric field oscillation plane being in parallel to the longitudinal direction of the metal wire 2 is reflected. The polarization extinction ratios of the transmission and reflection, which indicate the performance of the polarizer 4 at this time, can be expressed by the following expressions:

Transmission extinction ratio=−10-Log(Transmission factor of *TM* polarized light/Transmission factor of *TE* polarized light) (1)

Reflection extinction ratio=−10-Log(Reflection factor of TE polarized light/Reflection factor of *TM* polarized light) (2)

In general, it is considered that a polarizer with a higher polarization extinction ratio exhibits a higher performance.

Parameters which determine the characteristic of the wire grid polarizer 4 are: the type of the metal used for the metal wire 2; the period Λ of forming the metal wire; a duty ratio f (in other words, a filling factor), which is a ratio of a single wire width w to the unit period Λ; and the thickness t of the metal wire.

As the types of the metal to be used for the metal wire 2, it is preferable to use a metal with high reflectance, e.g., gold, silver, aluminum and the like.

In order to achieve still higher performance of the wire grid polarizer 4, it is necessary to prevent a high-order diffraction light from being generated in the wire grid structural body 3. For this, it is necessary that the value of the period Λ satisfies "Λ<λ/2" with respect to the wavelength λ of the incident light. Especially, in order to achieve the high extinction ratio in the broadband wavelength region, it is preferable that the period Λ be further smaller. For example, it is preferable to satisfy "Λ<λ/10".

In order to have only a zero-order diffraction light, that is, the straight light, it is necessary to satisfy the following expression provided that the angle of incident light which makes incidence to the wire grid polarizer 4 is $\theta_1$, the angle of refraction is $\theta_2$, the refractive index of the light-transmitting substrate 1 is $n_2$.

$$\lambda/(n_2 \sin\theta_2 - \sin\theta_1) \geq \Lambda \qquad (3)$$

Further, considering the case of normal incidence and the minimum wavelength of the light to be used is about 450 nm and the refractive index of the light-transmitting substrate is about 1.5 to 2.2, it is predicted that the value of Λ is required to be in the region of about 200 to 300 nm. Needless to say, the value of Λ may be smaller than this.

In general, it is known that the optical property of the diffraction grating with a grating period of less than the wavelength of the light can be estimated precisely to some extent by a calculation according to RCWA method (Rigorous Coupled-Wave Analysis). As for a method utilizing the RCWA method, an example may be a software called G-Solver and the like, which is distributed by Grating Solver Development Company, U.S.A.

The above-described wire grid polarizer is nothing but an optical element in which the period of the metal wires 2 arranged in grid form is less than the wavelength to be used. Thus, it is possible to determine the optical property using the RCWA method.

The results of the diffraction efficiency of the transmission and reflection of TE and TM polarized lights calculated by using the RCWA method are shown in FIG. 2 and FIG. 3 as a transmission factor and a reflection factor.

FIG. 2 and FIG. 3 show the results of the calculation provided that the period Λ of the first-order metal wire grid is 200 nm, the duty ratio is 0.4, the material of the metal wire 2 is gold, and the depth of the grid, that is, the thickness t of the metal wire 2 is used as a parameter.

As can be seen from the transmission factor and the reflection factor shown in FIG. 2 and FIG. 3, the incident light of the TE polarization is mostly reflected at a certain grating depth or more. However, as for the TM polarized light, the transmission factor changes periodically when the grating depth changes.

Next, FIG. 4 is a graph showing the polarization extinction ratios of the transmission and the reflection calculated based on the transmission factor and the reflection factor shown in FIG. 2, FIG. 3 and the expressions (1), (2).

As can be seen from FIG. 4, in order to increase the polarization extinction ratio of the transmitted light, the depth of the grating may be simply deepened.

In the meantime, in order to increase the polarization extinction ratio of the reflected light to the maximum, it is necessary to select the grating depth at which the transmission factor of the TM polarized light becomes the maximum, that is, a specific grating depth so that the reflection factor becomes the maximum.

FIG. 5 shows the wave dependency of the transmission factor and the reflection factor in the band of 0.4 to 0.9 μm and when the initial grating depth at which the transmission factor of the TM polarized light becomes the maximum is set to be 200 nm.

As can be seen from FIG. 5, the extinction ratios of the transmitted light and the reflected light are remarkably decreased especially in the low wavelength region.

There are some reasons which cause the deterioration of the extinction ratio in such low wavelength. One of the known reasons is a phenomenon called anomaly and another is an interference effect of the thin film.

In order to decrease such deterioration, one of the methods is to reduce the grating period, that is, the period Λ of the wire grid to be about the wavelength λ/10. However, it is quite difficult at this point to achieve the processing of such precision even in the optical region of 450 to 650 nm in terms of the resolution of the lithography.

For example, as in U.S. Pat. No. 6,122,103, proposed is a wire grid polarizer in which the polarization extinction ratio in the broadband is increased and leveled by decreasing the effective refractive index of a glass substrate through forming a groove on the glass substrate of the wire grid polarizer.

As a polarizer which achieves high polarization extinction ratio of especially the reflected light in the broadband by eliminating the anomaly in the low wavelength, proposed is a polarizer as disclosed, for example, in Japanese Patent Unexamined Publication No. 2002-328234, in which the polarizer comprises a multilayered-film metal wire made of a dielectric material and a multilayered film of a metal.

However, the wire grid polarizer disclosed in the U.S. Pat. No. 6,122,103 has such a problem that it takes time to process the minute groove formed on the glass substrate.

Also, as for the polarizer disclosed in Japanese Patent Unexamined Publication No. 2002-328234, it has such a problem that it takes time to form and process the multilayered film since it is necessary to form the dielectric material and the multilayered film of the metal using vacuum evaporation and the like and then process the multilayered film to a wire by a pattern of some hundreds nm.

Further, there is a problem in the polarizer disclosed in Japanese Patent Unexamined Publication No. 2002-328234 that it is difficult to perform etching since the types of gas suitable for dry etching used for the metal layer and an oxide layer are different from each other at the time of performing micro-processing onto the grating of the alternate layers of the metal and the oxide.

Thus, as for a wire grid polarizer which enables to maintain the polarization extinction ratio high and level in the broadband wavelength region with a simple structure, an effective proposal has not yet been presented.

The present invention has been designed to overcome the foregoing problems. It is an object of the present invention to provide a wire grid polarizer with an excellent optical property, which enables to maintain the polarization extinction ratio high and level in the broadband wavelength region with a simple structure.

SUMMARY OF THE INVENTION

In order to achieve the foregoing object, a wire grid polarizer according to a first aspect of the present invention comprises, a wire grid structural body in which a plurality of metal wires are formed and arranged at a certain period in a direction orthogonal to a longitudinal direction of the metal wires on a light-transmitting substrate, for transmitting only a specific linearly polarized light out of linearly polarized lights being orthogonal to each other, which make incident to the wire grid structural body, wherein a cross-sectional shape of the metal wire, which is orthogonal to the longitudinal direction, has a taper shape.

With the first aspect of the present invention, it enables to reduce the Fabry-Perot interference effect caused by the difference between the refractive index of the light-transmitting substrate and that of an air layer by giving a spatial modulation to the refractive index of the metal wire through forming the cross-sectional shape of the metal wire to be in a taper shape.

As a result, it is possible to prevent the deterioration of the polarization extinction ratio of the reflected light in the low waveband through reducing the change in the TM transmission factor due to the wavelength without requiring a complicated groove processing applied to the light-transmitting substrate or providing another thin film layer.

In a second aspect of the wire grid polarizer according the first aspect of the present invention, a period of forming the metal wires is 200 nm or less.

With the second aspect of the present invention, further, it is possible to surely prevent a high-order diffraction light from being generated in the wire grid structural body.

In a third aspect of the wire grid polarizer according to the first or second aspect of the present invention, a material of the metal wire is gold, silver, aluminum or copper.

With the third aspect of the present invention, further, it enables to achieve more excellent optical property by selecting a material with a high reflection factor.

In a fourth aspect of the wire grid polarizer according to any one of the first to third aspects of the present invention, a low-refractive-index layer having a lower refractive index than that of the light-transmitting substrate is formed between the light-transmitting substrate and the wire grid structural body.

With the fourth aspect of the present invention, further, it is possible to maintain the polarization extinction ratio still higher in the broadband wavelength region.

With the wire grid polarizer according to the first aspect of the present invention, it enables to achieve the wire grid polarizer with an excellent optical property, which can maintain the polarization extinction ratio high and level in the broadband wavelength region by a simple structure at a low cost and with high efficiency.

Further, with the wire grid polarizer according to the second aspect of the present invention, in addition to the effect of the wire grid polarizer of the first aspect, it enables to achieve the wire grid polarizer with a more excellent optical performance.

Moreover, with the wire grid polarizer according to the third aspect of the present invention, in addition to the wire grid polarizer of the second or the third aspect, it enables to achieve the wire grid polarizer with a more excellent optical performance.

With the wire grid polarizer according to the fourth aspect of the present invention, in addition to the wire grid polarizer according to any one of the first to the third aspects, it enables to achieve the excellent wire grid polarizer with still higher polarization extinction ratio provided that there is a large permissible range of the wave dependency of the polarization extinction ratio.

DESCRIPTION OF THE PREFERRED EMBODIMENTS

Figure 1:
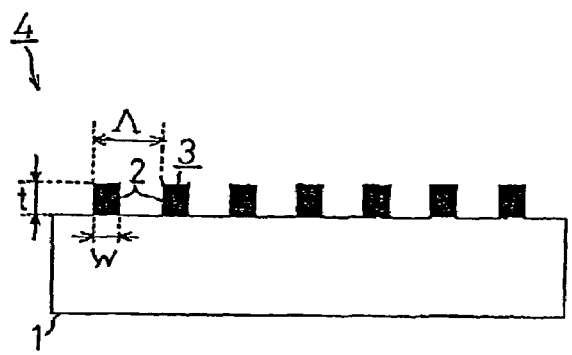
FIG. 1 is a lateral cross section for illustrating a model of an embodiment of a conventional wire grid polarizer.
Figure 2:
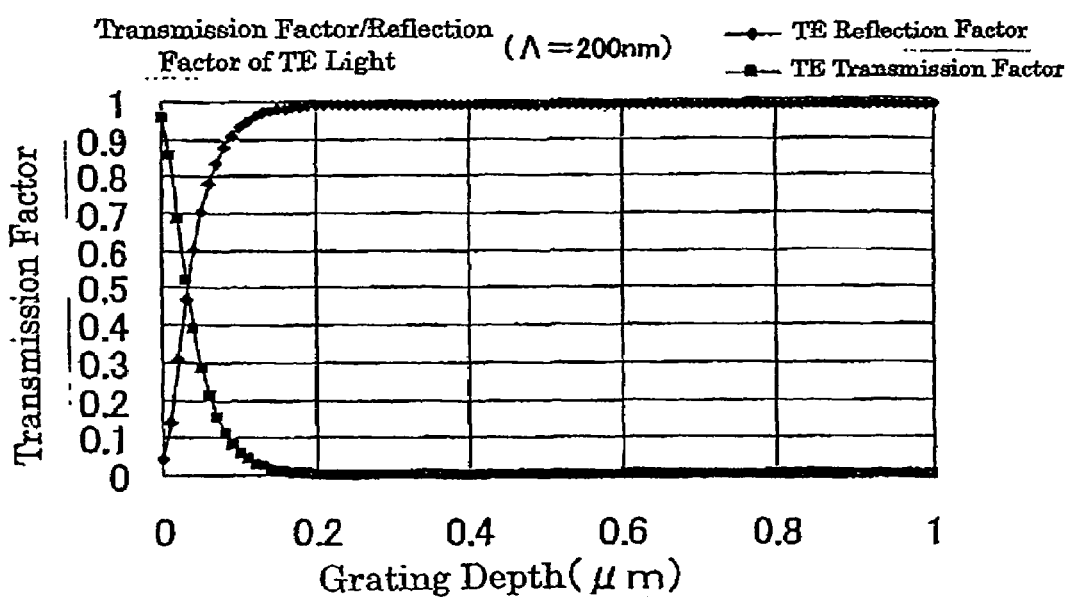
FIG. 2 is a graph showing a transmission factor/reflection factor of TE polarized light of the wire grid polarizer of FIG. 1.

In the followings, embodiments of a wire grid polarizer according to the present invention will be described by referring to FIG. 6 to FIG. 13. The components having the same basic structure as those of the conventional polarizer or similar to those will be described by applying the same reference numerals.

Figure 6:
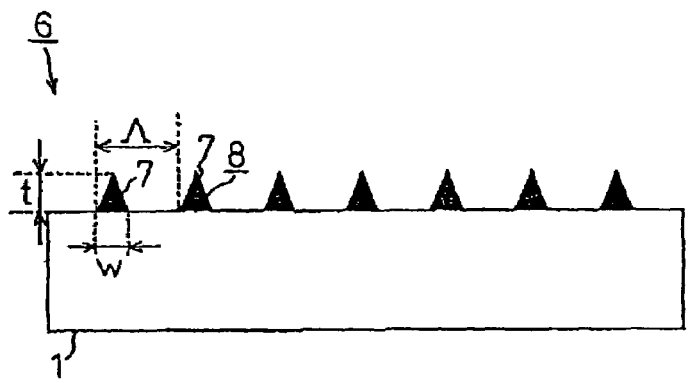
FIG. 6 is a lateral cross section for illustrating a model of an embodiment of a wire grid polarizer according to the present invention.

As shown in FIG. 6, a wire grid polarizer 6 according to the embodiment comprises, on a light-transmitting substrate 1, a wire grid structural body 8 in which a plurality of long metal wires 7 are formed and arranged at a certain period in a direction orthogonal to the longitudinal direction. The wire grid structural body 8 transmits only one of the linearly polarized lights, such as the TM polarized light, out of the incident linearly polarized lights which are orthogonal to each other, and reflects the other polarized light such as the TE polarized light.

Further, in the embodiment, it is so formed that the cross section of the metal wire 7 orthogonal to the longitudinal direction is in a taper or triangular shape which becomes narrower towards the tip.

By forming the cross section of the metal wire 7 in a taper shape as described above, it enables to give a spatial modulation to the refractive index of the metal wire 7. Thereby, it enables to reduce Fabry-Perot interference effect caused by the difference between the refractive index of the light-transmitting substrate 1 and that of an air layer.

As a result, it becomes possible to prevent the deterioration of the polarization extinction ratio of the reflected light in the low wavelength region through reducing the change in the TM transmission factor due to the wavelength without requiring a complicated groove processing on a light-transmitting substrate and providing another thin film layer as disclosed in U.S. Pat. No. 6,122,103 and in Japanese Patent Unexamined Publication No. 2002-328234.

Thereby, in the broadband wavelength region, it enables to maintain the polarization extinction ratio high and level.

As the light-transmitting substrate 1, a light-transmitting material such as glass, ceramics, resin or the like can be selected as appropriate.

Also, in the embodiment, the period of forming the metal wire 7 is set 200 nm or less.

Thereby, it is possible to satisfy the condition of the expression (3) for having only the zero-order diffraction light in the case where the minimum wavelength of the light to be used is about 450 nm, the refractive index of the light-transmitting substrate 1 is about 1.5 to 2.2. Therefore, it becomes possible to surely prevent the high-order diffraction light from being generated in the wire grid structural body 8.

Further, in the embodiment, the material of the metal wire 7 is gold, silver, aluminum or copper.

Thus, it is possible to select the metal with high reflection factor as the material for the metal wire 7 so that a more excellent optical property can be achieved.

Figure 7:
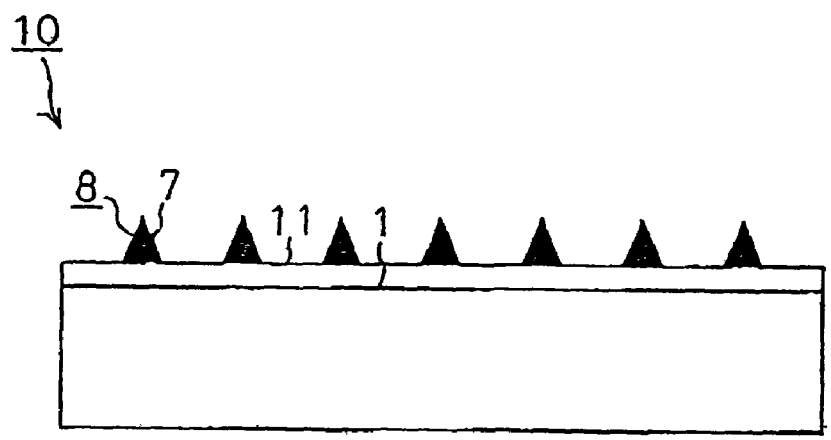
FIG. 7 is a lateral cross section for illustrating a model of another embodiment of a wire grid polarizer according to the present invention, which differs from the one shown in FIG. 6.

Furthermore, as shown in the wire grid polarizer 10 of FIG. 7, a low-refractive-index layer 11 with a lower refractive index than that of the light-transmitting substrate 1 may be formed between the light-transmitting substrate 1 and the wire grid structural body 8.

Thereby, it enables to achieve still higher polarization extinction ratio in the broadband wavelength region. However, it is achieved on condition that there is a large permissible range of the wave dependency of the polarization extinction ratio.

Examples of the low-refractive-index layer 11 may be a dielectric material such as $SiO_2$, $MgF_2$ or the like. For forming the low refractive index layer 11, various methods may be used, e.g., vacuum evaporation, plasma CVD, ion plating, sputtering. Further, as the light-transmitting substrate 1 with a higher refractive index than that of the low-refractive-index layer 11, for example, SF-6, BAF-51, N-LAF3, products of SCHOTT may be used, which are glass substrates with high refractive index in which the refractive index is controlled by impurities in the glass.

Next, EXAMPLES of the present invention will be described.

EXAMPLE 1

First, in EXAMPLE 1, the transmission factor/the reflection factor of the two polarized lights of TE and TM, which are orthogonal to each other, were calculated on the wire grid polarizer 6 in a structure shown in FIG. 6. For the calculation, the above-described RCWA method was used with 24 terms of the Fourier series.

Figure 8:
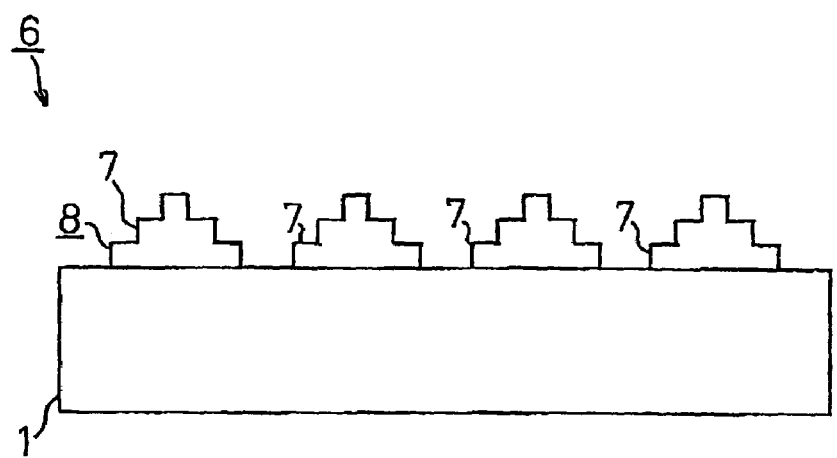
FIG. 8 is an illustration showing the lateral cross section of a wire grid polarizer which is approximated for calculating the polarization extinction ratio in the embodiment of the wire grid polarizer according to the present invention.

In this calculation, for approximation of the metal wire 7, presumably provided was the three-layered metal wire 7 whose cross section was in a three-step shape as shown in FIG. 8.

The duty ratio of the first layer of the metal wire was presumably set as 0.4, that of the second layer as 0.266, that of the third layer as 0.133 and the film thicknesses of each layer were presumed the same, and the total film thickness t of the metal wire, that is, the depth of the grating was varied from 0 to 1 µm. The transmission factor/the reflection factor of the TE polarized light and the TM polarized light under this condition were calculated. At this time, the type of the metal used as the metal wire 7 was presumed gold. The refractive index of the metal wire 7 expressed by n=n'+ki (i: imaginary unit) was set as n'=0.33, k=4.710 at 0.65 µm (wavelength of lights), and the refractive index of the light-transmitting substrate 1 was set as 1.5145.

Figure 9:
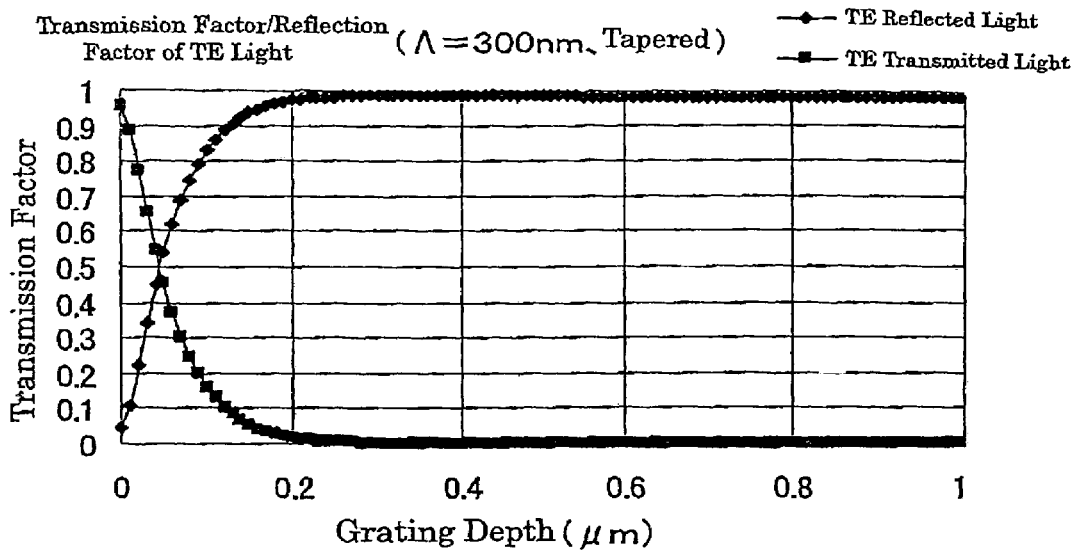
FIG. 9 is a graph showing the transmission factor/reflection factor of the TE polarized light of the wire grid polarizer of FIG. 8 in the embodiment of the wire grid polarizer according to the present invention.
Figure 10:
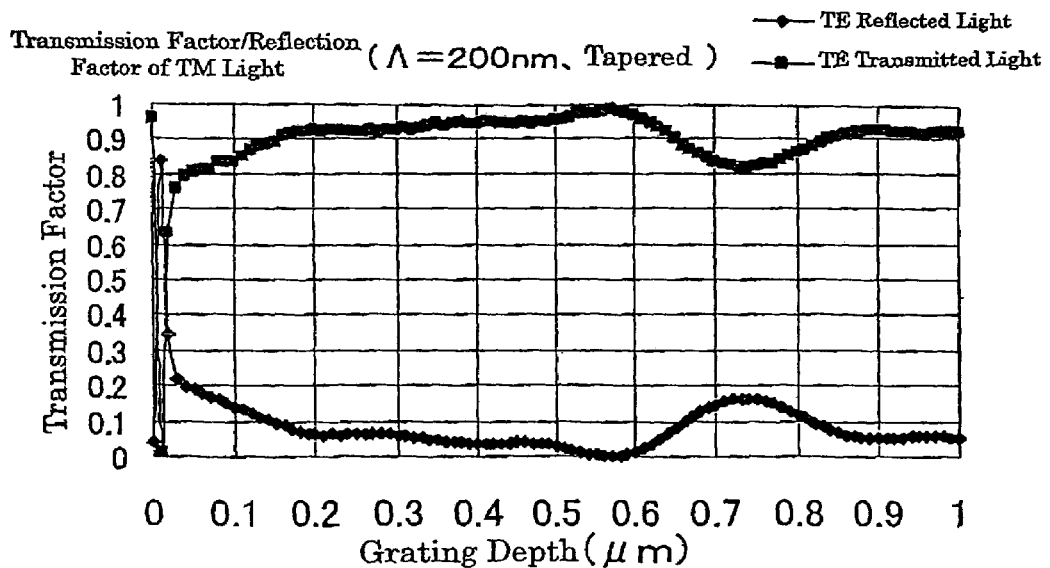
FIG. 10 is graph showing the transmission factor/reflection factor of the TM polarized light of the wire grid polarizer of FIG. 8 in the embodiment of the wire grid polarizer according to the present invention.

As a result, obtained were the transmission factor/the reflection factor of the TE polarized light as shown in FIG. 9 and the transmission factor/the reflection factor of the TM polarized light as shown in FIG. 10.

Figure 3:
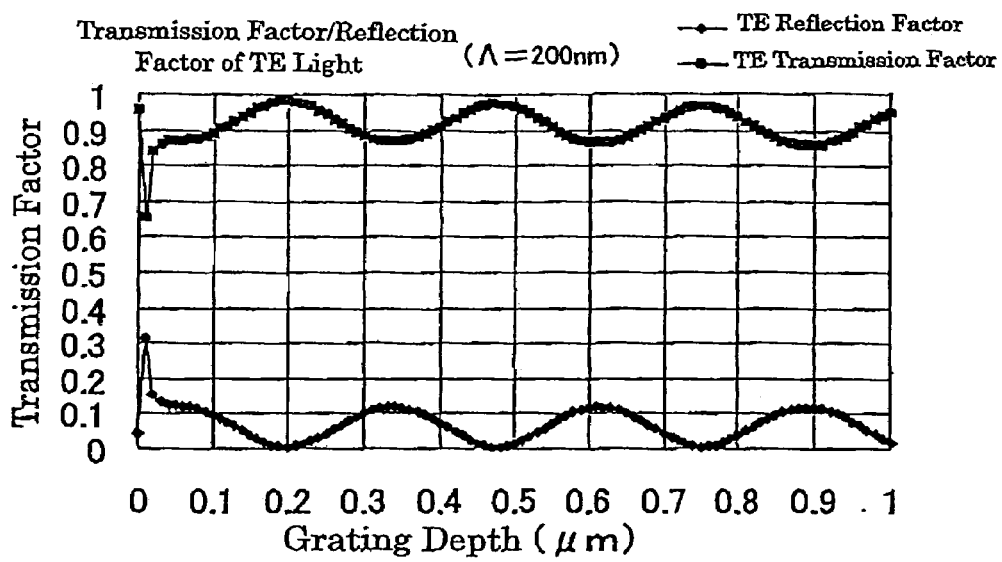
FIG. 3 is a graph showing a transmission factor/reflection factor of TM polarized light of the wire grid polarizer of FIG. 1.
Figure 4:
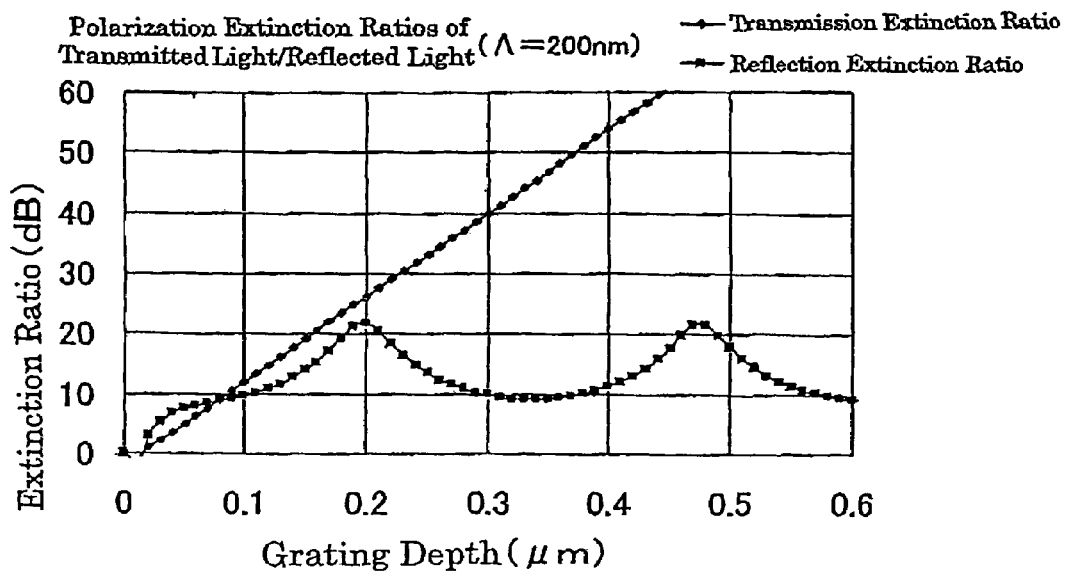
FIG. 4 is a graph showing the polarization extinction ratio of the wire grid polarizer of FIG. 1, which is obtained using the transmission factor/reflection factor shown in FIG. 2, FIG. 3 and an expression (1) and an expression (2)
Figure 5:
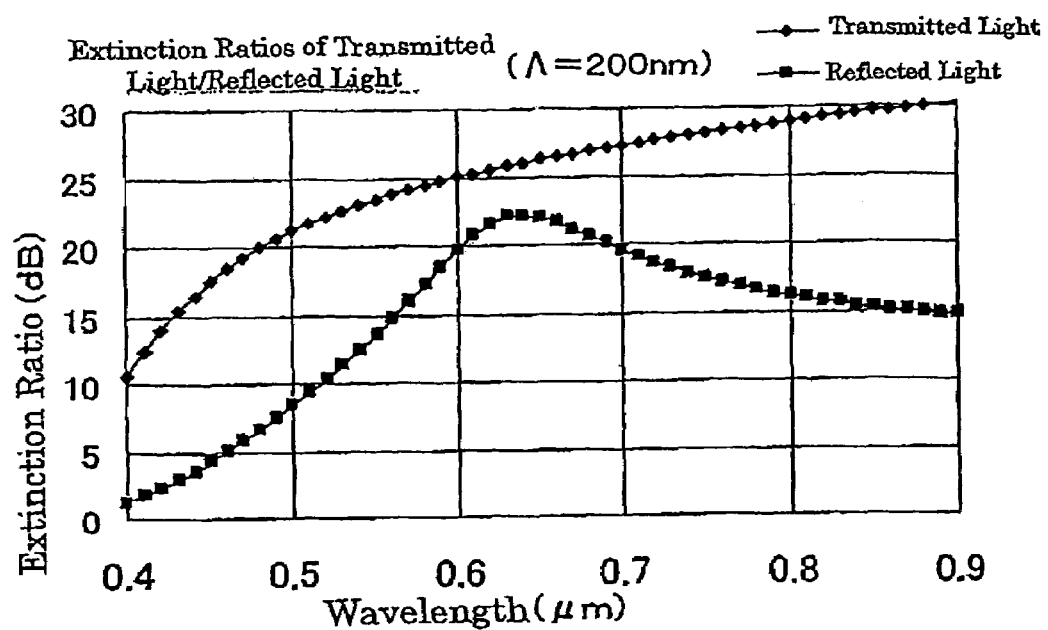
FIG. 5 is a graph showing the wave dependency of the polarization extinction ratio of the wire grid polarizer of FIG. 1.

As can be seen from FIG. 10, in the wire grid polarizer 6 of this EXAMPLE, the grating depth, i.e. the periodical ripple of the transmission factor with respect to the film thickness of the metal wire 7 was decreased than that of the conventional wire grid polarizer 4 as shown in FIG. 3.

Figure 11:
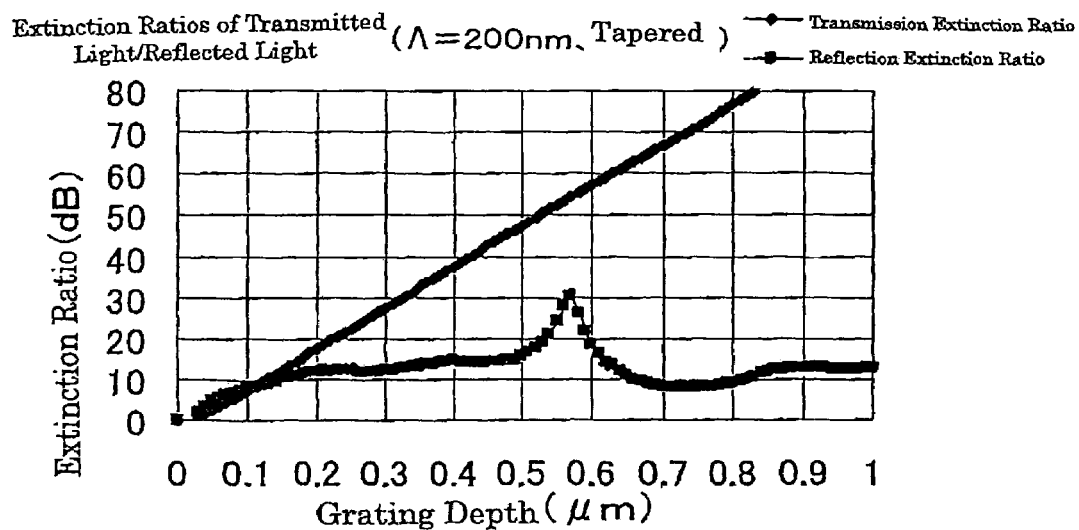
FIG. 11 is a graph showing the polarization extinction ratio which is obtained according to the polarization transmission factor shown in FIG. 9 and FIG. 10 in the embodiment of the wire grid polarizer according to the present invention.

FIG. 11 shows the polarization extinction ratio which was calculated based on the polarization transmission factors shown in FIG. 9 and FIG. 10. As shown in FIG. 11, the wire grid polarizer 6 of this EXAMPLE exhibited the property in which the polarization extinction ratio maintained the level state for the change in the grating depth.

Figure 12:
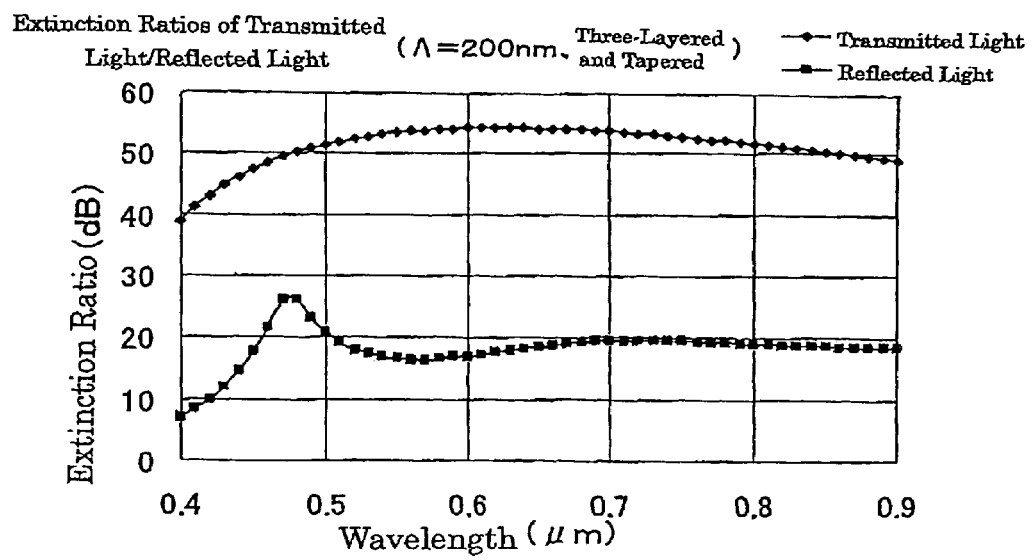
FIG. 12 is a graph showing the wave dependency of the polarization extinction ratio of the wire grid polarizer of FIG. 8 in the embodiment of the wire grid polarizer according to the present invention.

FIG. 12 shows the wave dependency of the polarization extinction ratio in the band of the wavelength 0.4 to 0.9 µm in the case where the total film thickness of the metal wire shown in FIG. 8 was set 540 mn.

As can be seen from FIG. 12, it exhibited a property with a relatively level and high extinction ratio in a wide waveband of about 480 nm to 900 nm.

EXAMPLE 2

Next, in EXAMPLE 2, the transmission factor/the reflection factor of the TE polarized light and the TM polarized light were calculated on the wire grid polarizer 10 shown in FIG. 7 in the same manner as EXAMPLE 1. In the wire grid polarizer 10, a low-refractive-index layer 11 was formed on the light-transmitting substrate 1 having a high refractive index, and a wire grid structural body 8 with a taper-shape cross section was formed thereon.

More specifically, calculation was carried out on assumption that 20 nm of $SiO_2$ layer as the low-refractive-index layer 11 was formed on the light-transmitting substrate 1 made of SF-6 (wavelength: $\lambda$=0.65 µm, refractive index: 1.797), a product of SCHOTT, and the wire grid structural body 8 in the same taper shape as that of EXAMPLE 1 was formed thereon.

Figure 13:
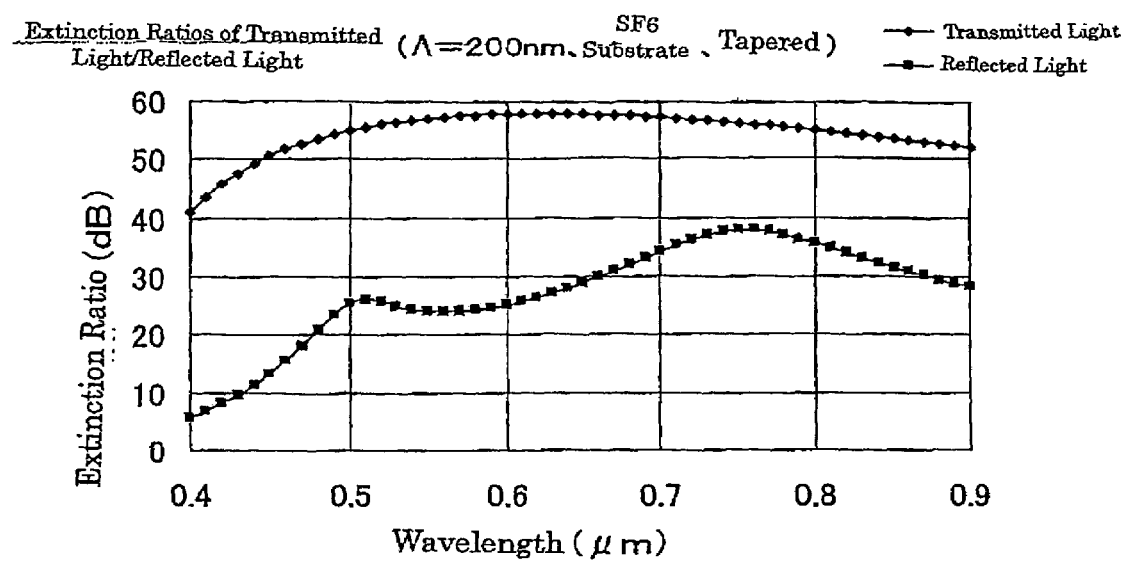
FIG. 13 is a graph showing the wave dependency of the polarization extinction ratio of the wire grid polarizer of FIG. 7 in the embodiment of the wire grid polarizer according to the present invention.

As a result, the wave dependency of the polarization extinction ratio as shown in FIG. 13 was obtained.

As can be seen from FIG. 13, the absolute value of the polarization extinction ratio was improved as a whole in the wire grid polarizer of this EXAMPLE.

Therefore, with the wire grid polarizer according to the embodiment, it is possible to maintain the polarization extinction ratio high and level state in a broadband wavelength region by a simple structure. Moreover, the manufacturing efficiency of the wire grid polarizer can be improved and the cost reduction can be achieved.

The present invention is not intended to be limited to the above-described embodiments but various modifications are possible as necessary.

What is claimed is:

1. A wire grid polarizer comprising, a wire grid structural body in which a plurality of metal wires are formed and arranged at a certain period in a direction orthogonal to a longitudinal direction of said metal wires on a light-transmitting substrate, for transmitting only a specific linearly polarized light out of linearly polarized lights being orthogonal to each other, which make incident to said wire grid structural body, wherein
   a cross-sectional shape of said metal wire, which is orthogonal to the longitudinal direction, has a triangular shape.

2. The wire grid polarizer according to claim 1, wherein a period of forming said metal wires is 200 nm or less.

3. The wire grid polarizer according to claim 1 or 2, wherein a material of said metal wire is one selected from the group consisting of gold, silver, aluminum and copper.

4. The wire grid polarizer according to claim 1 or 2, wherein a low-refractive-index layer having a lower refractive index than that of said light-transmitting substrate is formed between said light-transmitting substrate and said wire grid structural body.

5. The wire grid polarizer according to claim 3, wherein a low-refractive-index layer having a lower refractive index than that of said light-transmitting substrate is formed between said light-transmitting substrate and said wire grid structural body.

* * * * *